United States Patent
Kobayashi et al.

(10) Patent No.: US 9,795,161 B2
(45) Date of Patent: Oct. 24, 2017

(54) TASTE-IMPROVING AGENT

(75) Inventors: Yasuyuki Kobayashi, Saitama (JP);
Takehiko Watanabe, Saitama (JP);
Takeharu Nakahara, Chiba (JP);
Yoshikazu Endo, Chiba (JP)

(73) Assignees: RIKEN VITAMIN CO., LTD., Tokyo (JP); KIKKOMAN CORPORATION, Chiba (JP)

( * ) Notice: Subject to any disclaimer, the term of this patent is extended or adjusted under 35 U.S.C. 154(b) by 685 days.

(21) Appl. No.: 14/345,694

(22) PCT Filed: Sep. 12, 2012

(86) PCT No.: PCT/JP2012/073303
§ 371 (c)(1),
(2), (4) Date: Apr. 25, 2014

(87) PCT Pub. No.: WO2013/047201
PCT Pub. Date: Apr. 4, 2013

(65) Prior Publication Data
US 2014/0328991 A1 Nov. 6, 2014

(30) Foreign Application Priority Data
Sep. 30, 2011 (JP) .................. 2011-218492

(51) Int. Cl.
| | | |
|---|---|---|
| *A23L 1/30* | (2006.01) | |
| *A23L 1/226* | (2006.01) | |
| *A23L 27/24* | (2016.01) | |
| *A23L 2/52* | (2006.01) | |
| *A23L 27/00* | (2016.01) | |
| *A23L 27/20* | (2016.01) | |
| *A23L 33/145* | (2016.01) | |
| *A23L 23/00* | (2016.01) | |
| *A23L 23/10* | (2016.01) | |

(52) U.S. Cl.
CPC .............. *A23L 27/24* (2016.08); *A23L 2/52* (2013.01); *A23L 23/00* (2016.08); *A23L 23/10* (2016.08); *A23L 27/2028* (2016.08); *A23L 27/88* (2016.08); *A23L 33/145* (2016.08); *A23Y 2220/00* (2013.01); *A23Y 2260/00* (2013.01)

(58) Field of Classification Search
CPC ...... A23L 27/24; A23L 27/2028; A23L 27/88; A23L 23/10; A23L 23/00; A23L 33/145; A23L 2/52
See application file for complete search history.

(56) References Cited

U.S. PATENT DOCUMENTS

| | | | | |
|---|---|---|---|---|
| 4,214,008 A | * | 7/1980 | Groben | ................ A23K 10/16 426/335 |
| 4,297,375 A | | 10/1981 | Shackelford | |
| 4,676,987 A | | 6/1987 | Ahern et al. | |
| 4,874,625 A | * | 10/1989 | Hartman | ................ A23L 27/215 426/520 |
| 5,230,912 A | * | 7/1993 | Yajima | ................ A23C 9/1234 426/42 |
| 6,242,040 B1 | | 6/2001 | Kakiuchi et al. | |
| 6,827,952 B2 | * | 12/2004 | Ando | .................... A21D 8/045 426/20 |
| 7,115,291 B1 | * | 10/2006 | Kuma | .................. A23C 9/1307 426/43 |
| 2006/0127560 A1 | * | 6/2006 | Back | .................... A23C 9/1315 426/656 |
| 2007/0117193 A1 | | 5/2007 | Park et al. | |
| 2007/0231367 A1 | | 10/2007 | Fukui | |
| 2008/0193591 A1 | | 8/2008 | Wada et al. | |
| 2010/0086643 A1 | * | 4/2010 | Hatanaka | ................ C12G 3/06 426/50 |
| 2010/0112652 A1 | | 5/2010 | Bogaert et al. | |

FOREIGN PATENT DOCUMENTS

| | | | |
|---|---|---|---|
| CA | 2502380 | A1 | 4/2004 |
| JP | S56-55177 | A | 5/1981 |
| JP | S62-32855 | A | 2/1987 |
| JP | 2007259836 | A | 10/2007 |
| JP | 2011062171 | A | 3/2011 |
| JP | 2011130669 | A | 7/2011 |
| WO | WO-9802051 | A1 | 1/1998 |
| WO | WO-2006114918 | A1 | 11/2006 |
| WO | WO-2012011402 | A1 | 1/2012 |

OTHER PUBLICATIONS

Gaudreau, H., Champagne, C.P., Goulet, J., Conway, J. 1997. "Lactic Fermentation of Media Containing High Concentrations of Yeast Extracts." J. Food Sci. vol. 62, pp. 1072-1075.*
Saha, B.C., Nakamura, L.K. 2002. "Production of Mannitol and Lactic Acid by Fermentation With Lactobacillus intermedius NRRL B-3693." Biotechnology and Bioengineering. vol. 82, pp. 864-871.*
Mondragon-Parada, M.E., Najera-Martinez, M., Juarez-Ramirez, C., Galindez-Mayer, J., Ruiz-Ordaz, N., Cristiani-Urbina, E. 2006. "Lactic Acid Bacteria Production From Whey." Applied Biochemistry and Biotechnology. vol. 134, pp. 223-232.*
Kotzamanidis, C., Roukas, T., Skaracis, G. 2002. "Optimization of lactic acid production from beet molasses by Lactobacillus delbrueckii NCIMB 8130." World Journal of Microbiology and Biotechnology. vol. 18, pp. 441-448.*
"Skim Milk Powder." (MILKingredients.ca. 2011; Downloaded Oct. 12, 2016 from http://www.milkingredients.ca/index-eng.php?id=192).*
Extended Search Report for European Patent Application No. 12836477.5, dated Oct. 21, 2015.

(Continued)

*Primary Examiner* — Nikki H Dees
(74) *Attorney, Agent, or Firm* — Marshall, Gerstein & Borun LLP

(57) ABSTRACT

Provided is a taste-improving agent that suppresses the unpleasant taste of potassium, such as harshness, irritativeness, and bitterness without reducing the salty taste of a potassium-containing food or drink. The taste-improving agent for a potassium-containing food or drink comprises a lactic acid-fermented yeast extract that is obtainable by fermenting a yeast extract with a lactic acid bacterium and contains 7.5 (w/w) % or more of lactic acid relative to the solid content of the yeast extract.

3 Claims, No Drawings

(56) References Cited

OTHER PUBLICATIONS

Furukawa, Japan Food Science, pp. 39-43, vol. 50:1 (2011). Partial English Translation.
Naganuma et al. "Nyusan Hakko o Riyo shita Tsukemono Seizo Gijutsu no Kaihatu", Report of the Yamanashi Industrial Technology Center, pp. 115-121, No. 22 (2008). Partial English Translation.
Suzuki et al. "Shin Tennen Chomiryo no Kaihatsu ni Kansuru Kenkyu" Reports of the Shizuoka Industrial Technology Center, pp. 91-96, No. 31 (1986). Partial English Translation.
International Search Report in corresponding PCT/JP2012/073303 dated Oct. 16, 2012.
Written Opinion in corresponding PCT/JP2012/073303 dated Oct. 16, 2012.

\* cited by examiner

US 9,795,161 B2

TASTE-IMPROVING AGENT

TECHNICAL FIELD

The present invention relates to a taste-improving agent that suppresses the unpleasant taste of potassium, such as harshness, irritativeness, and bitterness without reducing the salty taste of a potassium-containing food or drink.

BACKGROUND ART

Common salt (sodium chloride) is conventionally an essential nutrient component for human beings, but the excess intake of salt is supposed to cause diseases such as high blood pressure, renal disease, and heart disease. On this account, it is required to reduce the intake of salt, especially the intake of sodium. A possible method for reducing the intake of salt is reducing the amount of salt used for seasoning or processing of foods and drinks, but simply reducing the amount of salt unfortunately results in a less salty taste and deterioration of flavor. To address this problem, potassium chloride is most commonly used at the present time as a salt alternative, which does not impair the salty taste or flavor of the foods and drinks. However, the potassium in potassium chloride or the like has a characteristic taste, specifically, unpleasant tastes such as harshness, irritativeness, and remaining bitterness. This greatly limits the usage and the application field of potassium.

Previously disclosed techniques for improving the taste characteristic of potassium include a salt alternative comprising potassium chloride and an autolyzed yeast extract in an amount effective to reduce the bitterness caused by the potassium chloride (Patent Literature 1), a seasoning that is used for reducing the amount of salt in a food and comprises, as an active component, a solid or semisolid flavor oil obtained by heating 100 parts by weight of an edible solid fat, 1 to 10 parts by weight of a yeast extract processed seasoning, and 0.3 to 5 parts by weight of water (Patent Literature 2), a salty taste enhancing agent comprising a mixture of an animal protein enzymatic decomposition product and a plant protein enzymatic decomposition product, potassium chloride, a basic amino acid, and sodium gluconate (Patent Literature 3), a taste-improving agent that is used for a potassium salt or a potassium salt-containing food or drink and comprises a carboxylic acid except quinic acid or a salt of the carboxylic acid except the potassium salt (Patent Literature 4), a potassium-containing food or seasoning comprising potassium ions and reduced maltose syrup at a particular ratio (Patent Literature 5), and suppression of the harshness of potassium chloride by adding a yeast extract (Non-Patent Literature 1). However, the related art techniques have advantages and disadvantages and do not necessarily provide a satisfactory effect, and there is still a demand for a further improved method.

CITATION LIST

Patent Literature

[Patent Literature 1] Japanese Patent Application Publication No. 56-055177
[Patent Literature 2] Japanese Patent Application Publication No. 2007-259836
[Patent Literature 3] Japanese Patent Application Publication No. 2011-062171
[Patent Literature 4] Japanese Patent Application Publication No. 2011-130669
[Patent Literature 5] Japanese Patent Application Publication No. 62-032856

Non-Patent Literature

[Non-Patent Literature 1] Japan Food Science, 2011, 50 (1), 39-43.

SUMMARY OF INVENTION

Technical Problem

An object of the present invention is to provide a taste-improving agent that suppresses the unpleasant taste of potassium, such as harshness, irritativeness, and bitterness without reducing the salty taste of a potassium-containing food or drink.

Solution to Problem

As a result of intensive studies to solve the problem, the inventors of the present invention have found that the problem can be solved by adding a lactic acid-fermented yeast extract to a potassium-containing food or drink. The inventors have further studied based on the finding and have completed the present invention.

Specifically, the present invention relates to
[1] a taste-improving agent for a potassium-containing food or drink, the agent comprising a lactic acid-fermented yeast extract obtainable by fermenting a yeast extract with a lactic acid bacterium, the lactic acid-fermented yeast extract containing 7.5 (w/w) % or more of lactic acid relative to the solid content of the yeast extract;
[2] the taste-improving agent for a potassium-containing food or drink according to the above [1], the agent further comprising a sugar alcohol and/or a gluconate;
[3] a potassium-containing food or drink comprising the taste-improving agent according to the above [1] or [2]; and
[4] a method for improving a taste, the method comprising adding the taste-improving agent according to the above [1] or [2] to a potassium-containing food or drink.

Advantageous Effects of Invention

The taste-improving agent of the present invention can suppress the unpleasant taste of potassium, such as harshness, irritativeness, and bitterness without reducing the salty taste of a potassium-containing food or drink.

DESCRIPTION OF EMBODIMENTS

A yeast extract used for the lactic acid-fermented yeast extract contained in the taste-improving agent of the present invention may be an extract produced, by a known extraction method, from brewer's yeast, baker's yeast, torula yeast, or the like as a raw material and may be a yeast extract used for foods, medicines, culture mediums, or other applications. In the present invention, the yeast extract may be a commercially available product or an extract produced by a known method using the above-mentioned yeast as a raw material. Examples of the commercially available yeast extract include Vertex (manufactured by Fuji Foods Corporation), Aromild (manufactured by Kohjin), Meast S (manufactured by Asahi Food & Healthcare Co., Ltd.), Koku Base (manufactured by Dai-Nippon Meiji Sugar Co., Ltd.), SK Yeast Extract (manufactured by Nippon Paper Chemicals Co., Ltd.), Gistex (manufactured by DSM), and KAV (manufactured by Ohly). In particular, a yeast extract from the baker's yeast as a raw material is preferred because such an extract is available inexpensively and stably. The yeast extract may be in any form including a liquid, a paste, and a powder.

Typical examples of the method for producing a yeast extract include an autolysis method (a method of lysing yeast cells by using, for example, an endogenous protease of the yeast), an enzymolysis method (a method of lysing yeast cells by adding an enzyme derived from microorganisms or plants), a hot water extraction method (a method of lysing yeast cells by immersing the yeast cells in hot water for a predetermined period of time), an acid or alkaline degradation method (a method of lysing yeast cells by adding various acids or alkalis to the yeast cells), a physical disruption method (a method of disrupting yeast cells by subjecting the yeast cells to sonication, high-pressure homogenization, or mixing and grinding with a solid such as glass beads), and a freezing and thawing (a method of disrupting yeast cells by subjecting the yeast cells to one or more cycles of freezing and thawing). These methods are non-limiting examples, and a yeast extract produced by any method may be used.

The lactic acid bacterium for fermenting the yeast extract into the lactic acid-fermented yeast extract contained in the taste-improving agent of the present invention is not particularly limited as long as the lactic acid bacterium can ferment the yeast extract to produce lactic acid. Examples of the lactic acid bacterium include microorganisms belonging to *Lactobacillus* and *Leuconostoc*. From the viewpoint of having flavors suitable for the addition to foods and drinks, specifically preferred are *Lactobacillus plantarum, Lactobacillus pentosus, Leuconostoc mesenteroides* subsp. *cremoris, Lactobacillus acidophilus*, and *Lactobacillus delbrueckii* subsp. *lactis*, for example. *Lactobacillus plantarum* is particularly preferred. These lactic acid bacteria can be used singly or in any combination.

The lactic acid-fermented yeast extract contained in the taste-improving agent of the present invention is obtainable by sufficiently fermenting a yeast extract with a lactic acid bacterium until the amount of lactic acid produced reaches about 7.5 (w/w) % or more relative to the solid content of the yeast extract. The obtained lactic acid-fermented yeast extract contains lactic acid in an amount of about 7.5 (w/w) % or more, and preferably about 15 (w/w) % or more, for example, about 20 (w/w) % relative to the solid content of the yeast extract. A lactic acid-fermented yeast extract containing lactic acid in an amount of more than about 40 (w/w) % relative to the solid content of the yeast extract usually has a poor balance of tastes due to the sourness derived from the lactic acid, which may depend on the degree of concentration of the yeast extract. The amount of lactic acid is thus preferably about 40 (w/w) % or less relative to the solid content of the yeast extract. For example, the lactic acid-fermented yeast extract contains lactic acid in an amount of about 7.5 to 40 (w/w) % and preferably about 15 to 30 (w/w) % relative to the solid content of the yeast extract.

The amount of lactic acid can be quantitatively determined according to a standard procedure, for example, by an enzymatic electrode method with lactate oxidase or lactate dehydrogenase or by liquid chromatography. Any lactic acid-fermented yeast extract of which the amount of contained lactic acid determined by any method known as the method for quantitatively determining lactic acid is within the range of the present invention is understood to fall within the technical scope of the present invention. Specifically, for example, the amounts of L-lactic acid and D-lactic acid in a sample dissolved and diluted in water are determined with Biosensor BF5 (manufactured by Oji Scientific Instruments, enzymatic electrode method), and the sum of the amounts is regarded as the amount of the lactic acid.

Here, the solid content of a yeast extract means the solid content of a lactic acid-fermented yeast extract after lactic acid fermentation of the yeast extract with a lactic acid bacterium. The amount of lactic acid relative to the solid content of a yeast extract refers to the total amount of the lactic acid produced by lactic acid fermentation and the lactic acid originally contained in the yeast extract. A lactic acid-fermented yeast extract in the form of a powder, for example, may contain a powdering aid such as dextrin and lactose. In this case, the solid content of the yeast extract in the present invention is the solid content of the yeast extract except the solid content of a component that is not derived from the lactic acid-fermented yeast extract, such as the powdering aid. For example, when a lactic acid-fermented yeast extract powder containing a powdering aid in an amount of 20 (w/w) % relative to the total amount has a lactic acid content of 10 (w/w) % and a water content of 0 (w/w) % relative to the total amount of the lactic acid-fermented yeast extract powder, the amount of lactic acid is 12.5 (w/w) % relative to the solid content of the yeast extract.

The solid content of the yeast extract can be determined by an evaporation-to-dryness method. Specifically, the lactic acid-fermented yeast extract is mixed with an appropriate amount (for example, about 20 (w/w) %) of sea sand, then the mixture is heated at about 110° C. until water completely evaporates, and the percentage by weight of the residual solid is determined. For a simpler method, a Brix value determined with a differential refractometer can be used in place of the value determined above. Any lactic acid-fermented yeast extract having a solid content, which can be determined by either method, within the numerical range below is understood to fall within the technical scope of the present invention. Typically, a liquid lactic acid-fermented yeast extract has a solid content of the yeast extract of about 45 to 65 (w/w) %, a paste-like lactic acid-fermented yeast extract has a solid content of the yeast extract of about 70 to 95 (w/w) %, and a powdery lactic acid-fermented yeast extract has a solid content of the yeast extract of about 50 to 99 (w/w) %.

For the fermentation of a yeast extract with a lactic acid bacterium, a culture liquid (also called pre-fermentation liquid) containing the yeast extract is preferably inoculated with the lactic acid bacterium to undergo the lactic acid fermentation. The culture liquid containing a yeast extract is preferably a pre-fermentation liquid containing a yeast extract and water as major components or a pre-fermentation liquid containing a yeast extract, a sugar source, and water as major components, for example. The present invention may use a pre-fermentation liquid having a simple composition as above and thus can easily produce a lactic acid-containing yeast extract at low cost. The culture liquid may contain various components that can be added to a culture liquid for usual fermentation with a lactic acid bacterium, such as nitrogen sources, carbon sources except sugars, various inorganic ions, vitamins, and antibiotics. Depending on the type of a lactic acid bacterium or the like, culture liquid containing less salt may be used for good growth.

Specifically, the pre-fermentation liquid can be prepared, for example, by diluting a yeast extract with water or the like so as to contain the yeast extract as a raw material in an amount of about 5 to 40% by mass, preferably about 20 to 30% by mass, in terms of solid content. In the case where a sugar source is added to the pre-fermentation liquid, a sugar source that can be utilized by a lactic acid bacterium may be added so as to be, for example, about 2 to 6% by mass, preferably about 3 to 4% by mass, at the start of culture.

The sugar source added to the pre-fermentation liquid may be any sugar source that can be utilized by a lactic acid bacterium. Examples of the sugar source include glucose, sucrose, fructose, lactose, galactose, and maltose and further include liquid sugars, fruit juices, vegetables, and honey containing such sugars. Among them, glucose or a liquid sugar containing glucose is preferred from the viewpoint of fermentability of a lactic acid bacterium. These sugar sources may be added singly or in combination.

After each component in the pre-fermentation liquid is uniformly dissolved and the pre-fermentation liquid is sterilized with heat and then cooled, inoculation of a lactic acid bacterium may be performed. The heat sterilization is typically carried out at about 70 to 130° C., and the cooling is typically carried out until the temperature drops to about 25 to 35° C. Before the sterilization, the pH of the pre-fermentation liquid may be adjusted to a pH suitable for fermentation, preferably about 5.0 to 7.0 using a pH adjuster. Examples of the pH adjuster include potassium hydroxide, sodium hydroxide, sodium carbonate, dipotassium hydrogen phosphate, tripotassium phosphate, and potassium carbonate.

The fermentation is performed according to a standard procedure, for example, by inoculating about 0.0001 to 1% by mass of a starter relative to the amount of the pre-fermentation liquid. The starter can be prepared by culturing a lactic acid bacterium to be used for the fermentation in a known culture medium according to a standard procedure. The fermentation temperature, which slightly varies with the type of the bacterium, is about 20 to 40° C., preferably about 25 to 35° C. for efficient production of lactic acid, and particularly preferably around 30° C. Static fermentation is typically performed, but the fermentation liquid may be mildly stirred in order to maintain a uniform temperature distribution in the liquid or to prevent bacterial cells from being settled. During the fermentation, the pH decreases as lactic acid is produced, and the pH adjuster may be added to the fermentation liquid to maintain the pH at about 5.0 to 7.0. The culture may be either aerobic culture or anaerobic culture.

The fermentation time can be appropriately set depending on the concentration of the yeast extract and other components and is not particularly limited as long as a desired amount of lactic acid is produced. The time is typically about 18 to 150 hours, preferably about 96 to 144 hours, and more preferably about 120 to 144 hours. The endpoint of the fermentation can be appropriately determined so that the finally obtained fermentation liquid is suitable as the lactic acid-containing yeast extract based on the amount of lactic acid produced. In an example where the solid content of the yeast extract in the culture liquid is about 25 (w/w) %, the fermentation can be terminated at the time when the pH of the culture liquid reaches about 3.5 to 4.5 due to the lactic acid produced. The amounts of other components than the lactic acid produced by the fermentation with a lactic acid bacterium may also be considered in determining the endpoint of the fermentation.

The pH of the lactic acid-fermented yeast extract obtained by the fermentation with a lactic acid bacterium as above can be adjusted by any pH adjuster usable in food production. The pH after adjustment is preferably about 4.5 to 7.0 and more preferably about 4.5 to 6.0. An excessively low pH causes a strong acid taste, and an excessively high pH causes bitterness, deteriorating the quality of the lactic acid-fermented yeast extract.

The lactic acid-fermented yeast extract contained in the taste-improving agent of the present invention may be concentrated, if desired, in order to increase the solid concentration of the yeast extract. The concentration method is not particular limited and may be a known concentration method such as concentration by heating under normal pressure, concentration by heating under reduced pressure, and freeze concentration. The concentrated extract may be further dried to yield a lactic acid-fermented yeast extract powder that can be easily handled. The drying method is not particularly limited and may be a known method such as freeze drying, spray drying, and drum drying.

The pH of the lactic acid-fermented yeast extract concentrated or powdered as above can be estimated from the pH measured in the liquid state before the concentration or the powdering. Alternatively, the pH can be estimated from the pH of the solution prepared by dissolving the concentrated or powdered lactic acid-fermented yeast extract in distilled water so that the solid content of the yeast extract is about 25 (w/w) %, for example.

The amount of the lactic acid-fermented yeast extract contained in the taste-improving agent of the present invention is not particularly limited. For example, the solid content of the yeast extract is about 5 to 100 parts by mass and preferably about 30 to 70 parts by mass.

A taste-improving agent comprising a sugar alcohol and/or a gluconate is another embodiment of the present invention. It is preferred to add a sugar alcohol and/or a gluconate because the harshness, the irritativeness, the bitterness, and the like are further suppressed. Examples of the sugar alcohol include sorbitol, maltitol, mannitol, and reduced sugar syrup, and reduced sugar syrup is preferred. Examples of the gluconate include sodium gluconate, potassium gluconate, and calcium gluconate, and sodium gluconate is preferred. The amount of the sugar alcohol is preferably about 200 to 800 parts by mass and more preferably about 300 to 700 parts by mass relative to 100 parts by mass of the solid content of the yeast extract contained in the lactic acid-fermented yeast extract. The amount of the gluconate is preferably about 50 to 400 parts by mass and more preferably about 100 to 300 parts by mass relative to 100 parts by mass of the solid content of the yeast extract contained in the lactic acid-fermented yeast extract.

The taste-improving agent of the present invention may be in any form, for example, a solid form or a liquid form, but is preferably in a solid form and particularly preferably in a powder form in consideration of ease in handling and preservability.

The taste-improving agent of the present invention may contain other components such as a diluent (for example, dextrin and lactose), an umami seasoning (for example, sodium L-glutamate), a yeast extract other than the taste-improving agent of the present invention, an animal or plant fat or oil, a phosphate such as potassium phosphate, and a citrate such as sodium citrate, to the extent not impairing the effect of the present invention.

The usage of the taste-improving agent of the present invention is not particularly limited. For example, the taste-improving agent may be added to a potassium-containing food or drink. It is also possible that the taste-improving agent is mixed with a potassium salt or a potassium salt-containing material and the mixture is dried as necessary and then added to a food or drink. The taste-improving agent may also be mixed with common salt, natural salt, or bittern.

Examples of the potassium salt include potassium chloride, potassium glutamate, potassium citrate, potassium hydroxide, potassium phosphate, and potassium gluconate, and potassium chloride is preferred.

The amount of the taste-improving agent of the present invention to be added varies with the concentration of potassium, food raw materials contained in the food or drink, and the like, but when the potassium is potassium chloride, for example, the amount of the lactic acid-fermented yeast extract is preferably about 0.1 to 300 parts by mass and more preferably about 0.3 to 200 parts by mass in terms of solid content of the yeast extract relative to 100 parts by mass of potassium chloride.

The taste-improving agent of the present invention is intended to be added to any foods and drinks that contain potassium, and can be added to any foods and drinks that necessitate taste improvement. For example, the taste-improving agent is specifically suited for foods and drinks of which the replacement ratio of sodium chloride with potassium chloride should be increased for the purpose of salt reduction but the increase is limited due to the taste of potassium chloride, such as harshness. Replacement of about 30% by mass of sodium chloride with potassium chloride causes a marked harshness, depending on the food or drink. Here, the salt reduction means the reduction of sodium in a food. For example, when the sodium content of a food is reduced from 1,000 mg/100 g to 700 mg/100 g by reducing the amount of sodium chloride or the like, the food is 30% salt reduced. When sodium chloride is replaced with a potassium salt such as potassium chloride for the purpose of salt reduction, preferably about 10 to 60 parts by mass of sodium chloride and more preferably about 20 to 50 parts by mass of sodium chloride relative to 100 parts by mass of sodium chloride contained in the food can be replaced, depending on the composition of the food.

The present invention will now be described with reference to Examples, which are merely typical examples of the present invention and are not intended to limit the present invention.

EXAMPLES

<Production of Taste-Improving Agent (Lactic Acid-Fermented Yeast Extract)>

Example 1

To distilled water, a yeast extract (trade name: Gistex; manufactured by DSM, solid content: 74%) and a glucose fructose liquid (trade name: NF42 New Fructo R-O: manufactured by Showa Sangyo Co., Ltd.) were added so as to be at a solid content of 25 (w/w) % and at a concentration of 4 (w/w) %, respectively, and were dissolved to prepare a pre-fermentation liquid. To the pre-fermentation liquid, Lactobacillus plantarum (FERM P-21349) was added so that the number of bacteria was $1.0 \times 10^6$ cfu/mL at the beginning of fermentation. After 144 hours of fermentation at 30° C. to yield a fermentation liquid, potassium hydroxide was added to adjust the pH to 6.0, and then a powdering aid (trade name: Pinedex #2; manufactured by Matsutani Chemical Industry Co., Ltd., dextrin) was added so that the solid content of the yeast extract was 60 (w/w) % after drying. The resulting mixture was powdered by spray drying to give a taste-improving agent (Example Product 1) containing a lactic acid-fermented yeast extract.

In distilled water, 1.25 g of the taste-improving agent (Example Product 1) (solid content of the yeast extract: 0.75 g) was dissolved and dispersed to make the volume 250 mL, then the mixture was subjected to centrifugation (at 3,000 rpm for 15 minutes) to remove insoluble components, and the amounts of L-lactic acid and D-lactic acid were determined with a Biosensor BF5 (model; manufactured by Oji Scientific Instruments, enzymatic electrode method). The total amount of L-lactic acid and D-lactic acid was divided by the solid content of the yeast extract to calculate the ratio of the lactic acid relative to the solid content of the yeast extract, and as a result, the amount of lactic acid relative to the solid content of the yeast extract was 20.9 (w/w) %.

Table 1 shows the lactic acid bacterium used in, the fermentation condition of, and the amount of lactic acid relative to the solid content of the yeast extract in the taste-improving agent (Example Product 1).

Examples 2 to 4

Taste-improving agents (Example Products 2 to 4) containing lactic acid-fermented yeast extracts were produced in a similar manner to that in Example 1 except that Lactobacillus plantarum (FERM P-21349) was replaced with Lactobacillus brevis (NRIC1038), Lactobacillus bulgaricus (NRIC1041), or Lactobacillus casei (NRIC0644). Table 1 summarizes the lactic acid bacteria used in, the fermentation conditions of, and the amounts of lactic acid relative to the solid content of the yeast extract in the taste-improving agents (Example Products 2 to 4).

Examples 5 to 7

Taste-improving agents (Example Products 5 to 7) containing lactic acid-fermented yeast extracts were produced in a similar manner to that in Example 1 except that the fermentation time was changed from 144 hours to 48 hours, 24 hours, or 18 hours. Table 1 summarizes the lactic acid bacteria used in, the fermentation conditions of, and the amounts of lactic acid relative to the solid content of the yeast extract in the taste-improving agents (Example Products 5 to 7).

TABLE 1

| Taste-improving agent | Lactic acid bacterium used | Fermentation condition Temperature | Time | Amount of lactic acid relative to solid content of yeast extract |
|---|---|---|---|---|
| Example Product 1 | Lactobacillus plantarum | 30° C. | 144 hours | 20.9 (W/W)% |
| Example Product 2 | Lactobacillus brevis | | 144 hours | 16.2 (W/W)% |
| Example Product 3 | Lactobacillus bulgaricus | | 144 hours | 15.9 (W/W)% |
| Example Product 4 | Lactobacillus casei | | 144 hours | 15.6 (W/W)% |
| Example Product 5 | Lactobacillus plantarum | | 48 hours | 16.2 (W/W)% |
| Example Product 6 | | | 24 hours | 10.4 (W/W)% |
| Example Product 7 | | | 18 hours | 7.5 (W/W)% |

<Potassium-Containing Food or Drink: Soup Powder for Instant Chinese Noodles>
(1) Preparation of Soup Powder for Instant Chinese Noodles
In a plastic bag, the raw materials listed in Table 2 were placed in accordance with the formulation and mixed for 1 minute, and then the mixture was passed through a 20-mesh sieve to give a soup powder for instant Chinese noodles.

TABLE 2

| | Raw material | Amount |
|---|---|---|
| Sodium chloride | Trade name: Shinseien; manufactured by Nihonkaisui Co., Ltd. | 15.0 |
| Potassium chloride | Trade name: Potassium chloride (particulate); manufactured by Tomita Pharmaceutical Co., Ltd. | 10.0 |
| Sodium glutamate | Trade name: Ajinomoto (FC); manufactured by Ajinomoto Co., Inc. | 20.0 |
| Sugar | Trade name: HBS granulated beet sugar; manufactured by Hokuren Federation of Agricultural Cooperatives | 7.5 |
| Nucleic acid | Trade name: Double-plus; manufactured by Ajinomoto Co., Inc. | 0.5 |
| Dextrin | Trade name: AMICOL No. 5-L; manufactured by Nippon Starch Chemical Co., Ltd. | 5.5 |
| Monosodium succinate | Trade name: Monosodium succinate Kyowa-R; manufactured by Kyowa Hi Foods Co., Ltd. | 0.1 |
| Ginger powder | Trade name: OHS Ginger AA-G-F; manufactured by Allspice Co., Ltd. | 0.2 |
| Onion powder | Trade name: Onion P SK-3760 (20); manufactured by Nikken Foods Co., Ltd. | 1.5 |
| Garlic powder | Trade name: Garlic P SK-3237; manufactured by Nikken Foods Co., Ltd. | 0.5 |
| Pepper | Trade name: Black pepper powder RT; manufactured by Kanekasunspice Corporation | 0.2 |
| Modified starch | Trade name: Amicol TP; manufactured by Nippon Starch Chemical Co., Ltd. | 12.0 |
| Protein hydrolysate | Trade name: Belex #4000 (F); manufactured by Riken Vitamin Co., Ltd. | 3.0 |
| Chicken powder | Trade name: Chicken meat P CH; manufactured by Riken Vitamin Co., Ltd. | 15.0 |
| Soy sauce powder | Trade name: Soy sauce powder NK-1; manufactured by Kikkoman Corporation | 7.5 |
| Caramel coloring | Trade name: Powder caramel RS-W; manufactured by Semba Tohka Industries Co., Ltd. | 1.5 |

The numerical values in the table represent the mass (g).

(2) Preparation of Chinese Noodle Soup

[Experimental Plots 1 to 8]

In a 200-mL beaker, 5 g of the soup powder for instant Chinese noodles shown in Table 2, 0.3 g of the taste-improving agent (one of Example Products 1 to 7), and 95 g of hot water were placed to prepare a Chinese noodle soup as Experimental Plots 1 to 7. Separately, a Chinese noodle soup was prepared as Experimental Plot 8 in a similar manner except that the amount of the taste-improving agent (Example Product 1) was changed from 0.3 g to 0.1 g.

[Experimental Plots 9 to 13]

As Comparative Examples, Chinese noodle soups of Experimental Plots 9 to 12 were prepared in a similar manner to that in Experimental Plot 1 except that 0.3 g of the taste-improving agent (Example Product 1) was replaced with 0.08 g or 0.24 g of a yeast extract (trade name: Gistex; manufactured by DSM, solid content: 74%), 0.04 g of lactic acid (trade name: Fermented lactic acid 88%; purchased from Shin-Shin Foods Co., Ltd.), or 0.24 g of a yeast extract (trade name: Gistex; manufactured by DSM, solid content: 74%) and 0.04 g of lactic acid (trade name: Fermented lactic acid 88%; purchased from Shin-Shin Foods Co., Ltd.). Separately, a Chinese noodle soup was prepared as Experimental Plot 13 in a similar manner to that in Experimental Plot 1 except that no taste-improving agent (Example Product 1) was added.

(3) Evaluation Method and Results

A sensory test was carried out to evaluate the effects of suppressing harshness, irritativeness, and remaining bitterness of the Chinese noodle soups obtained. The sensory evaluation was carried out by 10 panelists in accordance with the evaluation standard shown in Table 3. The results obtained as the mean value of scores by the 10 panelists are represented by symbols in accordance with the standard below. Table 4 shows the results; the taste-improving agents, yeast extract and/or lactic acid used; and the amounts of them.

Symbolization

A: 3.5 or more

B: 2.5 or more and less than 3.5

C: 1.5 or more and less than 2.5

D: less than 1.5

TABLE 3

| Evaluation item | Evaluation standard | Score |
|---|---|---|
| Harshness | Little harshness was detected | 4 |
| | Harshness was slightly detected | 3 |
| | Harshness was detected | 2 |
| | Harshness was strongly detected | 1 |
| Irritativeness | Little irritativeness was detected | 4 |
| | Irritativeness was slightly detected | 3 |
| | Irritativeness was detected | 2 |
| | Irritativeness was strongly detected | 1 |
| Bitterness | Little bitterness was detected | 4 |
| | Bitterness was slightly detected | 3 |
| | Bitterness was detected | 2 |
| | Bitterness was strongly detected | 1 |

TABLE 4

| Experimental Plot | Component added | Amount | Harshness | Irritativeness | Remaining bitterness |
|---|---|---|---|---|---|
| Experimental Plot 1 | Taste-improving agent (Example Product 1) | 0.3 g | A | A | A |
| Experimental Plot 2 | Taste-improving agent (Example Product 2) | 0.3 g | B | B | B |
| Experimental Plot 3 | Taste-improving agent (Example Product 3) | 0.3 g | B | B | B |
| Experimental Plot 4 | Taste-improving agent (Example Product 4) | 0.3 g | B | B | B |
| Experimental Plot 5 | Taste-improving agent (Example Product 5) | 0.3 g | A | A | A |
| Experimental Plot 6 | Taste-improving agent (Example Product 6) | 0.3 g | A | A | A |
| Experimental Plot 7 | Taste-improving agent (Example Product 7) | 0.3 g | B | B | B |
| Experimental Plot 8 | Taste-improving agent (Example Product 1) | 0.1 g | B | B | B |
| Experimental Plot 9 | Yeast extract | 0.08 g | D | D | D |
| Experimental Plot 10 | Yeast extract | 0.24 g | C | C | C |
| Experimental Plot 11 | Lactic acid | 0.04 g | D | D | D |
| Experimental Plot 12 | Yeast extract, lactic acid | 0.24 g, 0.04 g | C | C | C |
| Experimental Plot 13 | None | — | D | D | D |

The results show that, by adding the taste-improving agent containing the lactic acid-fermented yeast extract to the potassium chloride-containing Chinese noodle soup, the harshness, the irritativeness, and the remaining bitterness were improved. In contrast, by adding the yeast extract that was not the lactic acid-fermented yeast extract and/or the lactic acid to the potassium chloride-containing Chinese noodle soup, none of the harshness, the irritativeness, and the remaining bitterness were improved.

During the sensory evaluation, salty taste sensibility was also evaluated. As a result, the salty taste sensibility was not impaired in each Experimental Plot.

<Potassium-Containing Food or Drink: Salt-Reduced Miso (Fermented Soybean Paste)>
(1) Preparation of Salt-Reduced Miso Solution
[Experimental Plots 14 to 21]

In a 200-mL beaker, 10 g of a salt-reduced miso (trade name: Oishii salt-reduced miso; manufactured by Marukome Co., Ltd., a miso in which a certain amount of sodium chloride was replaced with potassium chloride, containing 1 (w/w) % of potassium chloride), 0.3 g of the taste-improving agent (one of Example Products 1 to 7), and 90 g of hot water were placed to prepare a salt-reduced miso solution (Experimental Plots 14 to 20). Separately, a salt-reduced miso solution was prepared as Experimental Plot 21 in a similar manner except that the amount of the taste-improving agent (Example Product 1) was changed from 0.3 g to 0.1 g.

[Experimental Plots 22 to 26]

As Comparative Examples, salt-reduced miso solutions of Experimental Plots 22 to 25 were prepared in a similar manner to that in Experimental Plot 14 except that 0.3 g of the taste-improving agent (Example Product 1) was replaced with 0.08 g or 0.24 g of a yeast extract (trade name: Gistex; manufactured by DSM, solid content: 74%), 0.04 g of lactic acid (trade name: Fermented lactic acid 88%; purchased from Shin-Shin Foods Co., Ltd.), or 0.24 g of a yeast extract (trade name: Gistex; manufactured by DSM, solid content: 74%) and 0.04 g of lactic acid (trade name: Fermented lactic acid 88%; purchased from Shin-Shin Foods Co., Ltd.). Separately, a salt-reduced miso solution was prepared as Experimental Plot 26 in a similar manner to that in Experimental Plot 14 except that no taste-improving agent (Example Product 1) was added.

(2) Evaluation Method and Results

A sensory test was carried out to evaluate the effects of suppressing harshness, irritating smell, and remaining bitterness of the salt-reduced miso solutions obtained. The sensory evaluation was carried out in the same manner as in "(3) Evaluation Method in <Potassium-Containing Food or Drink: Soup Powder for Instant Chinese Noodles>." Table 5 shows the results; the taste-improving agents, yeast extract and/or lactic acid used; and the amounts of them.

TABLE 5

| Experimental Plot | Component added | Amount | Harshness | Irritativeness | Remaining bitterness |
|---|---|---|---|---|---|
| Experimental Plot 14 | Taste-improving agent (Example Product 1) | 0.3 g | A | A | A |
| Experimental Plot 15 | Taste-improving agent (Example Product 2) | 0.3 g | B | B | B |
| Experimental Plot 16 | Taste-improving agent (Example Product 3) | 0.3 g | B | B | B |
| Experimental Plot 17 | Taste-improving agent (Example Product 4) | 0.3 g | B | B | B |

TABLE 5-continued

| Experimental Plot | Component added | Amount | Harshness | Irritativeness | Remaining bitterness |
|---|---|---|---|---|---|
| Experimental Plot 18 | Taste-improving agent (Example Product 5) | 0.3 g | A | A | A |
| Experimental Plot 19 | Taste-improving agent (Example Product 6) | 0.3 g | A | A | A |
| Experimental Plot 20 | Taste-improving agent (Example Product 7) | 0.3 g | B | B | B |
| Experimental Plot 21 | Taste-improving agent (Example Product 1) | 0.1 g | B | B | B |
| Experimental Plot 22 | Yeast extract | 0.08 g | D | D | D |
| Experimental Plot 23 | Yeast extract | 0.24 g | C | C | C |
| Experimental Plot 24 | Lactic acid | 0.04 g | D | D | D |
| Experimental Plot 25 | Yeast extract, lactic acid | 0.24 g, 0.04 g | C | C | C |
| Experimental Plot 26 | None | — | D | D | D |

The results show that, by adding the taste-improving agent containing the lactic acid-fermented yeast extract to the salt-reduced miso solution, the harshness, the irritativeness, and the remaining bitterness were improved. In contrast, by adding the yeast extract that was not the lactic acid-fermented yeast extract and/or the lactic acid to the salt-reduced miso solution, none of the harshness, the irritativeness, and the remaining bitterness were improved.

During the sensory evaluation, salty taste sensibility was also evaluated. As a result, the salty taste sensibility was not impaired in each Experimental Plot.

<Potassium-Containing Food or Drink: Minestrone Soup Powder>

(1) Preparation of Minestrone Soup Powder

In a plastic bag, the raw materials listed in Table 6 were placed in accordance with the formulation and mixed for 1 minute, and then the mixture was passed through a 20-mesh sieve to give a minestrone soup powder. The obtained minestrone soup powder was a salt-reduced minestrone soup powder in which 34.8% by mass of sodium chloride was replaced with potassium chloride to reduce the sodium content (calculated value) at eating time from 300 mg/100 g before the replacement with potassium chloride to 210 mg/100 g.

TABLE 6

| | Raw material | Amount |
|---|---|---|
| Sodium chloride | Trade name: Shinseien; manufactured by Nihonkaisui Co., Ltd. | 18.0 |
| Potassium chloride | Trade name: Potassium chloride (particulate); manufactured by Tomita Pharmaceutical Co., Ltd. | 9.6 |
| Potassium phosphate | Trade name: Monopotassium phosphate; manufactured by Kirin Kyowa Foods Co., Ltd. | 2.0 |
| Sodium glutamate | Trade name: Ajinomoto (FC); manufactured by Ajinomoto Co., Inc. | 10.0 |
| Sugar | Trade name: HBS granulated beet sugar; manufactured by Hokuren Federation of Agricultural Cooperatives | 10.0 |
| Nucleic acid | Trade name: Double-plus; manufactured by Ajinomoto Co., Inc. | 0.5 |
| Dextrin | Trade name: AMICOL No. 5-L; manufactured by Nippon Starch Chemical Co., Ltd. | 7.0 |
| Monosodium succinate | Trade name: Monosodium succinate Kyowa-R; manufactured by Kyowa Hi Foods Co., Ltd. | 0.1 |
| Tomato powder | Trade name: Tomato Powder 707; manufactured by Iwaki Co., Ltd. | 28.0 |
| Tomato sauce powder | Trade name: NV Tomato sauce powder A-2913; manufactured by Nikken Foods Co., Ltd. | 5.0 |
| Mirepoix powder | Trade name: NV Mirepoix powder A-4383; manufactured by Nikken Foods Co., Ltd. | 3.0 |
| Potato powder | Trade name: Mashed potato powder; manufactured by Cradle Foods Co., Ltd. | 2.0 |
| Skim milk | Trade name: Snow Brand Skim Milk; manufactured by Snow Brand Milk Products Co., Ltd. | 2.0 |
| Malic acid | Trade name: DL-Malic acid, 60 mesh; manufactured by Iwata Chemical., Ltd. | 0.1 |
| Cheese powder | Trade name: Parmesan cheese powder; manufactured by Kelly Japan | 0.5 |
| Chicken extract powder | Trade name: Chicken bouillon powder TI; manufactured by DSP Gokyo Food & Chemical Co., Ltd. | 2.0 |
| Xanthan gum | Trade name: Echo Gum F; manufactured by DSP Gokyo Food & Chemical Co., Ltd | 0.2 |

The numerical values in the table represent the mass (g).

(2) Preparation of Minestrone Soup

[Experimental Plots 27 to 34]

In a 200-mL beaker, 2.4 g of the minestrone soup powder shown in Table 6, 0.4 g of the taste-improving agent (one of Example Products 1 to 7), and 97.2 g of hot water were placed to prepare a minestrone soup (Experimental Plots 27 to 33). Separately, a minestrone soup was prepared as Experimental Plot 34 in a similar manner except that the amount of the taste-improving agent (Example Product 1) was changed from 0.4 g to 0.2 g.

[Experimental Plots 35 to 39]

As Comparative Examples, minestrone soups of Experimental Plots 35 to 38 were prepared in a similar manner to that in Experimental Plot 27 except that 0.4 g of the taste-improving agent (Example Product 1) was replaced with 0.16 g or 0.32 g of a yeast extract (trade name: Gistex; manufactured by DSM, solid content: 74%), 0.05 g of lactic acid (trade name: Fermented lactic acid 88%; purchased from Shin-Shin Foods Co., Ltd.), or 0.32 g of yeast extract (trade name: Gistex; manufactured by DSM, solid content: 74%) and 0.05 g of lactic acid (trade name: Fermented lactic acid 88%; purchased from Shin-Shin Foods Co., Ltd.). Separately, a minestrone soup was prepared as Experimental Plot 39 in a similar manner to that in Experimental Plot 1 except that no taste-improving agent (Example 1) was added.

(3) Evaluation Method and Results

A sensory test was carried out to evaluate the effects of suppressing harshness, irritativeness, and remaining bitterness of the salt-reduced minestrone soups obtained. The sensory evaluation was carried out in the same manner as in "(3) Evaluation Method in <Potassium-Containing Food or Drink: Soup Powder for Instant Chinese Noodles>." Table 7 shows the results; the taste-improving agents, yeast extract and/or lactic acid used; and the amounts of them.

The results show that, by adding the taste-improving agent containing the lactic acid-fermented yeast extract to the minestrone soup powder, the harshness, the irritativeness, and the remaining bitterness were improved. In contrast, by adding the yeast extract that was not the lactic acid-fermented yeast extract and/or the lactic acid to the minestrone soup, none of the harshness, the irritativeness, and the remaining bitterness were improved. During the sensory evaluation, salty taste sensibility was also evaluated. As a result, the salty taste sensibility was not impaired in each Experimental Plot. The minestrone soup powder containing the product of the present invention was thus a very high quality product as a salt-reduced minestrone soup, in which the harshness, the irritativeness, and the remaining bitterness due to potassium were improved while the salty taste was not reduced.

<Production of Taste-Improving Agent (Lactic Acid-Fermented Yeast Extract) 2>

The lactic acid-fermented yeast extract (Example Product 1), a reduced maltose syrup powder (trade name: Amalty MR-50; manufactured by Mitsubishi Shoji Foodtech Co., Ltd.), and sodium gluconate (trade name: Healthious A; manufactured by Fuso Chemical Co., Ltd.) were placed in a plastic bag in accordance with the formulation shown in Table 8 and mixed for 1 minute. The mixture was then passed through a 20-mesh sieve to give Example Products 8 to 14 and Comparative Example Products 1 and 2.

TABLE 7

| Experimental Plot | Component added | Amount | Harshness | Irritativeness | Remaining bitterness |
|---|---|---|---|---|---|
| Experimental Plot 27 | Taste-improving agent (Example Product 1) | 0.4 g | A | A | A |
| Experimental Plot 28 | Taste-improving agent (Example Product 2) | 0.4 g | B | B | B |
| Experimental Plot 29 | Taste-improving agent (Example Product 3) | 0.4 g | B | B | B |
| Experimental Plot 30 | Taste-improving agent (Example Product 4) | 0.4 g | B | B | B |
| Experimental Plot 31 | Taste-improving agent (Example Product 5) | 0.4 g | A | A | A |
| Experimental Plot 32 | Taste-improving agent (Example Product 6) | 0.4 g | A | A | A |
| Experimental Plot 33 | Taste-improving agent (Example Product 7) | 0.4 g | B | B | B |
| Experimental Plot 34 | Taste-improving agent (Example Product 1) | 0.2 g | B | B | B |
| Experimental Plot 35 | Yeast extract | 0.16 g | D | D | D |
| Experimental Plot 36 | Yeast extract | 0.32 g | C | C | C |
| Experimental Plot 37 | Lactic acid | 0.05 g | D | D | D |
| Experimental Plot 38 | Yeast extract, lactic acid | 0.32 g 0.05 g | C | C | C |
| Experimental Plot 39 | None | — | D | D | D |

TABLE 8

|  | Example | | | | | | | Comparative Example | |
| --- | --- | --- | --- | --- | --- | --- | --- | --- | --- |
|  | 8 | 9 | 10 | 11 | 12 | 13 | 14 | 1 | 2 |
| Example Product 1 | 7.0 | 7.0 | 7.0 | 7.0 | 7.0 | 7.0 | 7.0 | — | — |
| Reduced maltose syrup powder | 16.8 | — | 16.8 | 33.6 | 8.4 | — | — | 16.8 | — |
| Sodium gluconate | — | 8.4 | 8.4 | — | — | 16.8 | 2.1 | — | 8.4 |

The numerical values in the table represent the mass (g).

Evaluation on Aqueous Solutions Containing Sodium Chloride and Potassium Salts

Sodium chloride (trade name: Shinseien; manufactured by Nihonkaisui Co., Ltd.), potassium chloride (trade name: Potassium chloride (particulate); manufactured by Tomita Pharmaceutical Co., Ltd.), potassium lactate (trade name: Potassium lactate solution; manufactured by Kanto Chemical Co., Inc., containing 80% potassium lactate), the taste-improving agent (one of Example Products 1 and 8 to 14 and Comparative Example Products 1 and 2), and water were mixed in accordance with the formulation in Table 9. The mixture was stirred for dissolution to prepare an aqueous solution containing sodium chloride and potassium salts (Experimental Plots 40 to 55). The aqueous solutions containing sodium chloride and potassium salts were salt-reduced aqueous sodium chloride solutions in which 20 to 60% of sodium chloride was replaced with a potassium salt.

A sensory test was carried out to evaluate the effects of suppressing harshness, irritating smell, and remaining bitterness and smells of the obtained aqueous solution containing sodium chloride and potassium salts. The sensory evaluation was carried out by 10 panelists in accordance with the evaluation standard shown in Table 10. The results obtained as the mean value of scores by the 10 panelists are represented by symbols in accordance with the evaluation standard below. Table 9 shows the results.

AA: 4.5 or more
A: not less than 3.5 and less than 4.5
B: not less than 2.5 and less than 3.5
C: not less than 1.5 and less than 2.5
D: less than 1.5

TABLE 10

| Evaluation item | Evaluation standard | Score |
| --- | --- | --- |
| Harshness | No harshness was detected | 5 |
|  | Little harshness was detected | 4 |
|  | Harshness was slightly detected | 3 |

TABLE 9

|  | Experimental Plot | | | | | | | | | | | | | | | |
| --- | --- | --- | --- | --- | --- | --- | --- | --- | --- | --- | --- | --- | --- | --- | --- | --- |
|  | 40 | 41 | 42 | 43 | 44 | 45 | 46 | 47 | 48 | 49 | 50 | 51 | 52 | 53 | 54 | 55 |
| Sodium chloride | 0.60 | 0.60 | 0.600 | 0.60 | 0.60 | 0.60 | 0.60 | 0.60 | 0.60 | 0.60 | 0.60 | 0.80 | 0.40 | 0.40 | 0.60 | 0.60 |
| Potassium chloride | 0.40 | 0.40 | 0.400 | 0.40 | 0.40 | 0.40 | 0.40 | 0.40 | 0.40 | 0.40 | 0.40 | 0.20 | 0.60 | 0.60 | 0.40 | 0.40 |
| Potassium lactate | — | — | — | — | — | — | — | — | — | — | 0.20 | — | — | — | — | — |
| Example Product 1 | 0.07 | 1.30 | 0.003 | — | — | — | — | — | — | — | 0.07 | 0.07 | 0.07 | 0.001 | — | — |
| Example Product 8 | — | — | — | 0.24 | — | — | — | — | — | — | — | — | — | — | — | — |
| Example Product 9 | — | — | — | — | 0.15 | — | — | — | — | — | — | — | — | — | — | — |
| Example Product 10 | — | — | — | — | — | 0.32 | — | — | — | — | — | — | — | — | — | — |
| Example Product 11 | — | — | — | — | — | — | 0.41 | — | — | — | — | — | — | — | — | — |
| Example Product 12 | — | — | — | — | — | — | — | 0.15 | — | — | — | — | — | — | — | — |
| Example Product 13 | — | — | — | — | — | — | — | — | 0.24 | — | — | — | — | — | — | — |
| Example Product 14 | — | — | — | — | — | — | — | — | — | 0.09 | — | — | — | — | — | — |
| Comparative Example Product 1 | — | — | — | — | — | — | — | — | — | — | — | — | — | — | 0.17 | — |
| Comparative Example Product 2 | — | — | — | — | — | — | — | — | — | — | — | — | — | — | — | 0.08 |
| Water | 98.93 | 97.70 | 98.997 | 98.76 | 98.85 | 98.68 | 98.59 | 98.85 | 98.76 | 98.91 | 98.73 | 98.93 | 98.93 | 99.00 | 98.83 | 98.92 |

TABLE 10-continued

| Evaluation item | Evaluation standard | Score |
|---|---|---|
| | Harshness was detected | 2 |
| | Harshness was strongly detected | 1 |
| Irritativeness | No irritativeness was detected | 5 |
| | Little irritativeness was detected | 4 |
| | Irritativeness was slightly detected | 3 |
| | Irritativeness was detected | 2 |
| | Irritativeness was strongly detected | 1 |
| Bitterness | No bitterness was detected | 5 |
| | Little bitterness was detected | 4 |
| | Bitterness was slightly detected | 3 |
| | Bitterness was detected | 2 |
| | Bitterness was strongly detected | 1 |
| Smell | No smells were detected | 5 |
| | Little smells were detected | 4 |
| | Smells were slightly detected | 3 |
| | Smells were detected | 2 |
| | Smells were strongly detected | 1 |

TABLE 11

| Experimental Plot | Harshness | Irritativeness | Remaining bitterness | Smells |
|---|---|---|---|---|
| Experimental Plot 40 | A | A | A | A |
| Experimental Plot 41 | A | A | A | C |
| Experimental Plot 42 | B | B | B | A |
| Experimental Plot 43 | AA | A | AA | A |
| Experimental Plot 44 | AA | AA | A | A |
| Experimental Plot 45 | AA | AA | AA | A |
| Experimental Plot 46 | A | A | AA | A |
| Experimental Plot 47 | A | A | AA | A |
| Experimental Plot 48 | A | AA | A | A |
| Experimental Plot 49 | A | AA | A | A |
| Experimental Plot 50 | A | A | A | A |
| Experimental Plot 51 | A | A | A | A |
| Experimental Plot 52 | A | A | A | A |
| Experimental Plot 53 | B | B | B | A |
| Experimental Plot 54 | B | C | B | AA |
| Experimental Plot 55 | B | B | C | AA |

The results show that, by adding Comparative Example Products 1 and 2 to the aqueous solutions containing sodium chloride and a potassium salt in Experimental Plots 54 and 55, the harshness was improved, but the irritativeness was not improved in Experimental Plot 54, and the remaining bitterness was not improved in Experimental Plot 55. In contrast, by adding Example Product 1 to the aqueous solutions in Experimental Plots 40, 50, 51, and 52, the harshness, the irritativeness, and the remaining bitterness were further improved. By adding 1.3% of Example Product 1 to the aqueous solution in Experimental Plot 41, the harshness, the irritativeness, and the remaining bitterness were further improved, but a yeast smell was detected. By adding 0.003% of Example Product 1 to the aqueous solution in Experimental Plot 42 and by adding 0.001% of Example Product 1 to the aqueous solution in Experimental Plot 53, the harshness, the irritativeness, and the remaining bitterness were improved. By adding Example Product 8 to the aqueous solution in Experimental Plot 43, the irritativeness was further improved and the harshness and the remaining bitterness were greatly improved. By adding Example Product 9 to the aqueous solution in Experimental Plot 44, the remaining bitterness was further improved and the harshness and the irritativeness were greatly improved. By adding Example Products 11 and 12 to the aqueous solutions in Experimental Plots 46 and 47, the harshness and the irritativeness were further improved and the remaining bitterness was greatly improved. By adding Example Products 13 and 14 to the aqueous solutions in Experimental Plots 48 and 49, the harshness and the remaining bitterness were further improved and the irritativeness was greatly improved. By adding Example Product 10 to the aqueous solution in Experimental Plot 45, the harshness, the irritativeness, and the remaining bitterness were greatly improved.

During the sensory evaluation, salty taste sensibility was also evaluated. As a result, the salty taste sensibility was not impaired in each Experimental Plot.

The invention claimed is:

1. A taste-improving agent for a potassium-containing food or drink, the agent comprising a lactic acid-fermented yeast extract obtainable by fermenting a yeast extract with a lactic acid bacterium, the lactic acid-fermented yeast extract containing 7.5 to 40 (w/w) % of lactic acid relative to the solid content of the yeast extract, wherein the agent further comprises a gluconate.

2. A potassium-containing food or drink comprising the taste-improving agent according to claim 1.

3. A method of improving a taste, the method comprising adding the taste-improving agent according to claim 1 to a potassium-containing food or drink.

* * * * *